June 9, 1964 A. WEINSCHENK Re. 25,596

DEVICE FOR PULLING-OVER AND WIPING-IN THE UPPERS OF SHOES

Original Filed Dec. 24, 1958

4 Sheets-Sheet 1

INVENTOR
Albert Weinschenk
By Richard Lund
Agt

DEVICE FOR PULLING-OVER AND WIPING-IN THE UPPERS OF SHOES

Original Filed Dec. 24, 1958 4 Sheets-Sheet 2

INVENTOR
Albert Weinschenk
By Richard Lynch
Agt

June 9, 1964 A. WEINSCHENK Re. 25,596

DEVICE FOR PULLING-OVER AND WIPING-IN THE UPPERS OF SHOES

Original Filed Dec. 24, 1958 4 Sheets-Sheet 3

INVENTOR
Albert Weinschenk
By Richard Good
Agt

June 9, 1964 A. WEINSCHENK Re. 25,596

DEVICE FOR PULLING-OVER AND WIPING-IN THE UPPERS OF SHOES

Original Filed Dec. 24, 1958 4 Sheets-Sheet 4

INVENTOR
Albert Weinschenk
By Richard Lund
Agt

United States Patent Office

Re. 25,596
Reissued June 9, 1964

25,596

DEVICE FOR PULLING-OVER AND WIPING-IN THE UPPERS OF SHOES

Albert Weinschenk, Seulberg, Germany, assignor, by mesne assignments, to Erich Gustav Henkel, Neu-Isenburg, Germany Original No. 3,039,121, dated June 19, 1962, Ser. No. 782,768, Dec. 24, 1958. Application for reissue Nov. 18, 1963, Ser. No. 332,987
8 Claims. (Cl. 12—10.1)

Matter enclosed in heavy brackets [ ] appears in the original patent but forms no part of this reissue specification; matter printed in italics indicates the additions made by reissue.

Known pulling-over, toe and side pulling over and cement lasting machines, employ last rests, also called three-point rests, which serve as last carriers during the pulling over and subsequent wiping in of the lasting margin of the upper against the innersole during the cementing of the upper to the innersole. These last rests also have fingers or holders at their front portions which extend out to the edge of the sole so as to press the innersole against the last until just before the commencement of the wiping in of the lasting margin of the upper against the last, thereby preventing wiping in of the lasting margin between the innersole and the last. At the commencement of this wiping operation, these fingers or holders move inwardly toward the last rest so as to be out of the way of the wipers. Owing to the extremely thin innersoles being used to an ever-increasing extent and partly due to the bulged bottoms of the last, these fingers or holders are, however, no longer sufficient. They only press the inner sole against the bottom of the last at the location of each finger, whereas, in the spaces between the fingers, the innersole is free to undulate and does not therefore bear completely against the bottom of the last and is not tight all round. As a result there is always the danger that the innersole may be caught by the wipers and wiped under, or even ripped off and damaged. Perfect operation of the machine is therefore not assured. Consequently these known machines are not satisfactory.

Another serious disadvantage of the known machines resides in the fact that the cement or adhesive must be applied to the upper and innersole by hand or by means of an auxiliary machine before the pulling-over operation. There is an urgent need to remedy this disadvantage by providing for the automatic application of the cement or adhesive.

The present invention relates to a device for uniformly and tightly pressing the innersole against the bottom of the last and for spraying adhesive onto the innersole and lasting margins of the upper immediately before the wiping-in operation.

In accordance with an aspect of this invention, the last carrying arrangement, that is the three-point rest, is surrounded by an outer independently adjustable and controllable shaped bed member, which presses the inner sole tightly against the bottom of the last over the entire area of the latter extending from the tip to the ball portion and right up to the edge of the last during the pulling-over operation and the commencement of the wiping-in movement.

This outer shaped bed member is also constructed with passages terminating in nozzles for spraying a suitable adhesive, such as latex, rubber latex and similar adhesive substances, at the appropriate moment against the innersole and the lasting margin of the upper at the same time.

The shaped bed member surrounding the last rest is also constructed with a bayonet joint which is adapted to receive the spray gun used for feeding the cement or adhesive, with the spray gun being attached or removed by a simple manipulation. In order to accommodate very differently shaped lasts, the shaped bed member surrounding the last rest is so constructed that it can be quickly exchanged merely by operating a knob or handle.

Moreover the external shape of the bed member surrounding the last rest corresponds to that of the last or the contour of the innersole, while the internal shape corresponds to the contour of the last carrier or rest with a slight clearance therebetween, and it is also shaped in the longitudinal direction of the last to correspond to the shape of the bottom of the last, with the result that the sole is everywhere pressed tightly against the bottom of the last. In order to minimize the number of bed members required for the production of all of the standard sizes of footwear, such sizes are divided into groups and a shaped bed member is provided for each group and has a shape corresponding to the smallest size of the related group. Each of the bed members will be suitable for use with all sizes of the related group as there is no appreciable difference between the contours at the tips of the various sizes in each group. Styles deviating slightly from the basic shape can also be worked with these shaped bed members depending upon the kind and thickness of the innersole.

Details of the invention will become apparent from the following dsecription of an embodiment of the invention illustrated by way of example in the accompanying drawings, in which.

Figure 1:
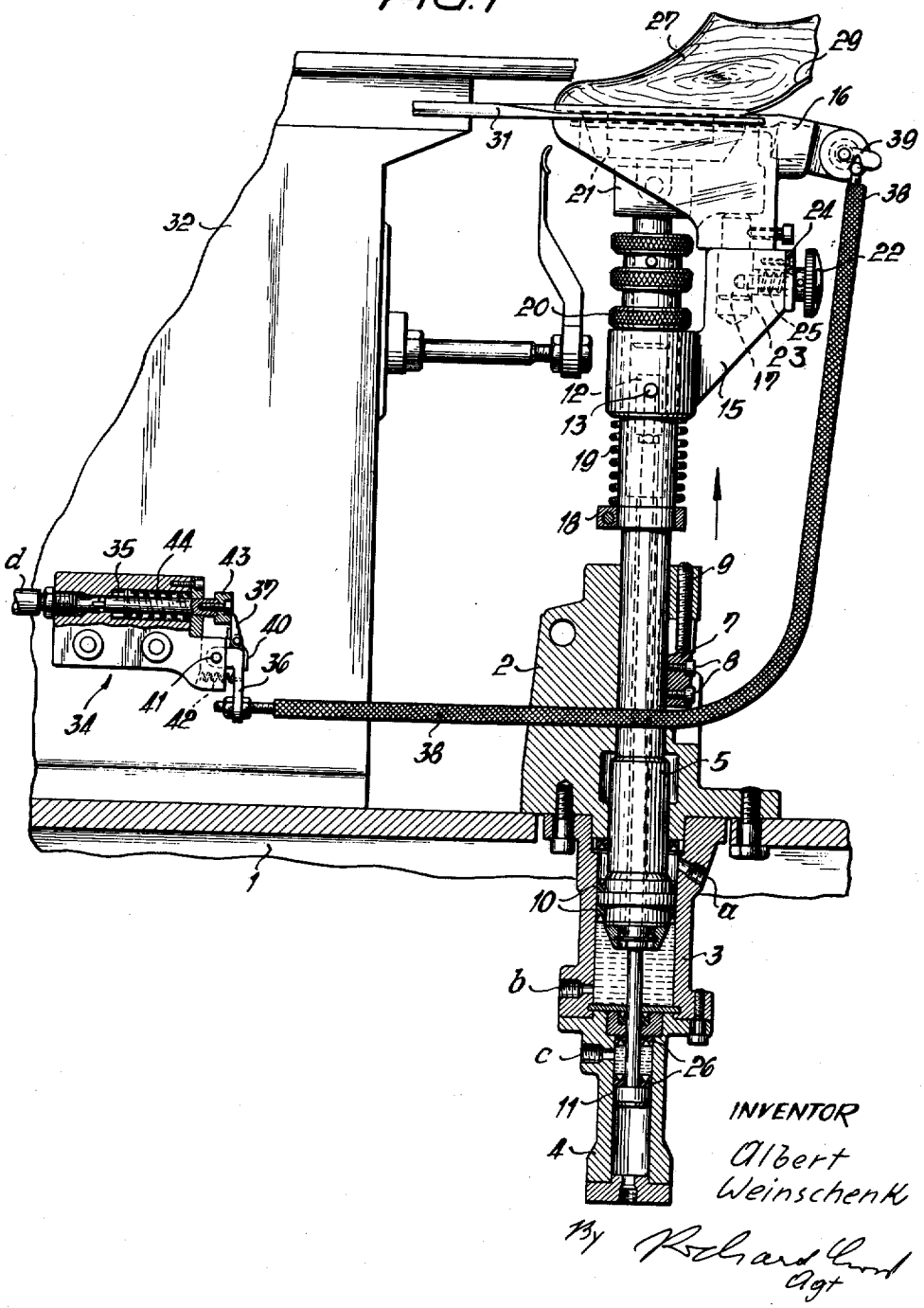
FIG. 1 is a side elevational view, partly broken away and in vertical section, of an arrangement embodying the present invention, and shown in the condition for an initial phase of operation.

Referring to the drawings in detail, and initially to FIG. 1 thereof, it will be seen that a machine provided in accordance with the invention for the purpose of pulling a shoe upper over the last and then cementing the lasting margin of the upper to the innersole pressed against the bottom of the last includes a frame 1 which carries a bearing 2 having a vertically disposed bore extending therethrough for slidably receiving and guiding a hollow piston rod 5. A cylinder 3 depends from bearing 2 in axial alignment with the vertical bore of the latter, and an auxiliary cylinder 4 depends from the lower end of cylinder 3. Sealing rings 10 carried by the lower end of piston rod 5 are reciprocable within cylinder 3 and form a piston on the rod 5, with the cylinder 3 having inlets a and b for fluid under pressure which are disposed adjacent the upper and lower ends, respectively, of cylinder 3 so that, when fluid under pressure is admitted to the upper end of cylinder 3 through inlet a, piston rod 5 is displaced downwardly and, when fluid is admitted to the lower end of cylinder 3 through the inlet b, piston rod 5 is displaced upwardly.

An inner rod extends vertically within hollow piston rod 5 and is axially slidable with respect to the latter, and the lower end of the inner rod projects downwardly from hollow piston rod 5 into auxiliary cylinder 4 and there carries a piston 11 which is vertically reciprocable within the auxiliary cylinder. A seal or packing 26 extends around the inner rod extending from piston 11 and serves to isolate cylinder 3 from cylinder 4 so that there will be no intermingling of the fluid under pressure supplied to the respective cylinders.

The auxiliary cylinder 4 is provided with an inlet c for fluid under pressure opening into the upper end portion of the auxiliary cylinder so that, when fluid under pressure is admitted through inlet c, such fluid acts upon piston 11 to downwardly displace the inner rod extending from that piston through the hollow piston rod 5.

A key block 8 is secured to hollow piston rod 5 by means of screws 7 and is slidably received in a vertical slot formed in bearing 2 so that such vertical slot and block 8 cooperate to prevent rotation of piston rod 5. Further, an adjustable abutment, in the form of a screw 9, is carried by bearing 2 and projects downwardly into the slot thereof receiving block 8 for engagement by the latter, thereby to limit the extent of the upward travel of piston rod 5.

The upper end of hollow piston rod 5 carries the usual three-point last rest 21 which is adapted to support the last 27 during the stretching of the upper 28 over the last (FIG. 2) and during the cementing of the lasting margin of the upper 28 to the innersole 29 which is disposed against the bottom of the last.

In order to ensure that the innersole 29 will be firmly and smoothly pressed against the bottom of the last 27 prior to the cementing operation, and further in order to provide means by which adhesive or cement can be automatically applied to the innersole 29 and to the lasting margin of the upper 28, the machine embodying the present invention further includes a bed member 16 preferably formed in one piece and closely surrounding the usual last rest 21. The upper surface of the bed member 16 is shaped so as to closely conform to the contours of the bottom of the last extending from the tip to the ball portion of the last and out to the side edges of the bottom of the last. The inner periphery of the bed member 16 closely conforms to the external shape of the last rest 21 with a small operating clearance therebetween, while the outer periphery of bed member 16 closely conforms to the shape of the outer edge or perimeter of the bottom of the last 27.

The bed member 16 is removably mounted, in a manner hereinafter described in detail, on a bracket 15 which extends to one side of hollow piston rod 5 and is integral with a sleeve that is axially slidable on the upper portion of the hollow piston rod. Such sleeve or bracket 15 is connected to the upper end of the inner rod extending from piston 11 by means of a pin 13 extending diametrically across the interior of hollow rod 5 and having its opposite end portions projecting slidably through axial slots formed in hollow rod 5 for reception in radial holes of the sleeve of bracket 15, and a link 12 which extends from the upper end of the rod of piston 11 and embraces the central portion of pin 13.

A collar 18 is suitably secured on hollow piston rod 5 between bearing 2 and the sleeve of bracket 15, and a helical compression spring 19 extends around hollow piston rod 5 and bears, at its opposite ends, against the underside of the sleeve of bracket 15 and the collar 18, respectively. Thus, spring 19 yieldably urges the bracket 15, and hence the bed member 16, upwardly relative to the last rest 21 carried by hollow piston rod 5, and thereby causes the bed member 16 to normally press the innersole 29 against the bottom of last 27, in the manner represented in FIGS. 1 and 2. However, when fluid under pressure is supplied to the upper portion of auxiliary cylinder 4 by way of the inlet c, the downward movement of piston 11 causes a corresponding downward displacement of bed member 16 relative to the last rest 21 surrounded thereby, as shown in FIG. 3, and thereby permits the usual wipers 31 to be operated for wiping the lasting margin of upper 28 under insole 29.

The pin 13 which cooperates with the link 12 in connecting bracket 15 to the upper end of the rod extending from piston 11 also cooperates with the axial slots formed in hollow piston rod 5 in order to prevent turning of the bracket 15 relative to piston rod 5, and thereby insuring the proper positioning of the bed member 16 relative to last rest 21.

In order to position and releasably attach the bed member 16 with respect to the bracket 15, the bed member has a pin 17 depending therefrom and received in an upwardly opening vertical bore formed in bracket 15. The pin 17 is releasably held within the related bore of block 15 by means of a locking bolt 23 having a knob 22 at its outer end and being axially slidable in a bore formed in bracket 15 at right angles to the vertical bore of the latter receiving the pin 17. The pin 17 has a recess for receiving the inner end of locking bolt 23, and the latter is urged inwardly for engagement in such recess by means of a compression spring 25 which acts, at its outer end, against a guide plate 24 suitably secured to bracket 15. Thus, when it is desired to replace the bed member 16, for example, during the manufacture of a shoe on a last having substantially different dimensions, it is only necessary to pull out the knob 22 of locking bolt 23 in order to release the pin 17 and permit withdrawal of the latter from the related bore of bracket 15.

In order to permit the bed member 16 to properly seat itself against the innersole applied against the bottom of the last, the sleeve of bracket 15 extending around hollow piston rod 5 preferably has an inner diameter that is larger than the external diameter of that piston rod, thereby making the bracket 15 and the bed member 16 carried thereby free to move radially and tilt to a small extent with respect to the hollow piston rod 5 which is guided for strictly vertical movement.

Figure 2:
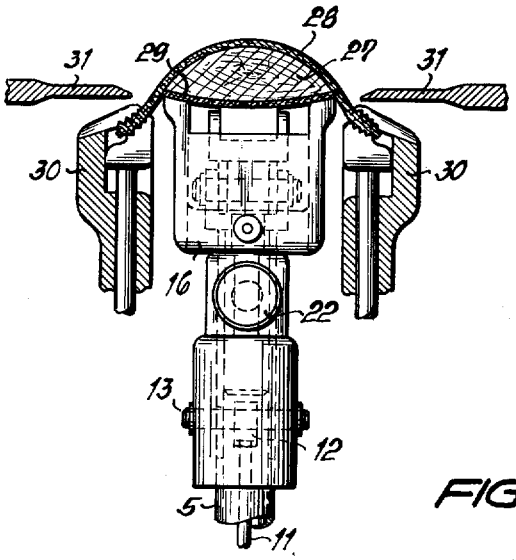
FIG. 2 is a transverse sectional view of the last during the pulling over of the upper and showing how the inner sole is then pressed against the last by the arrangement embodying the invention.
Figure 3:
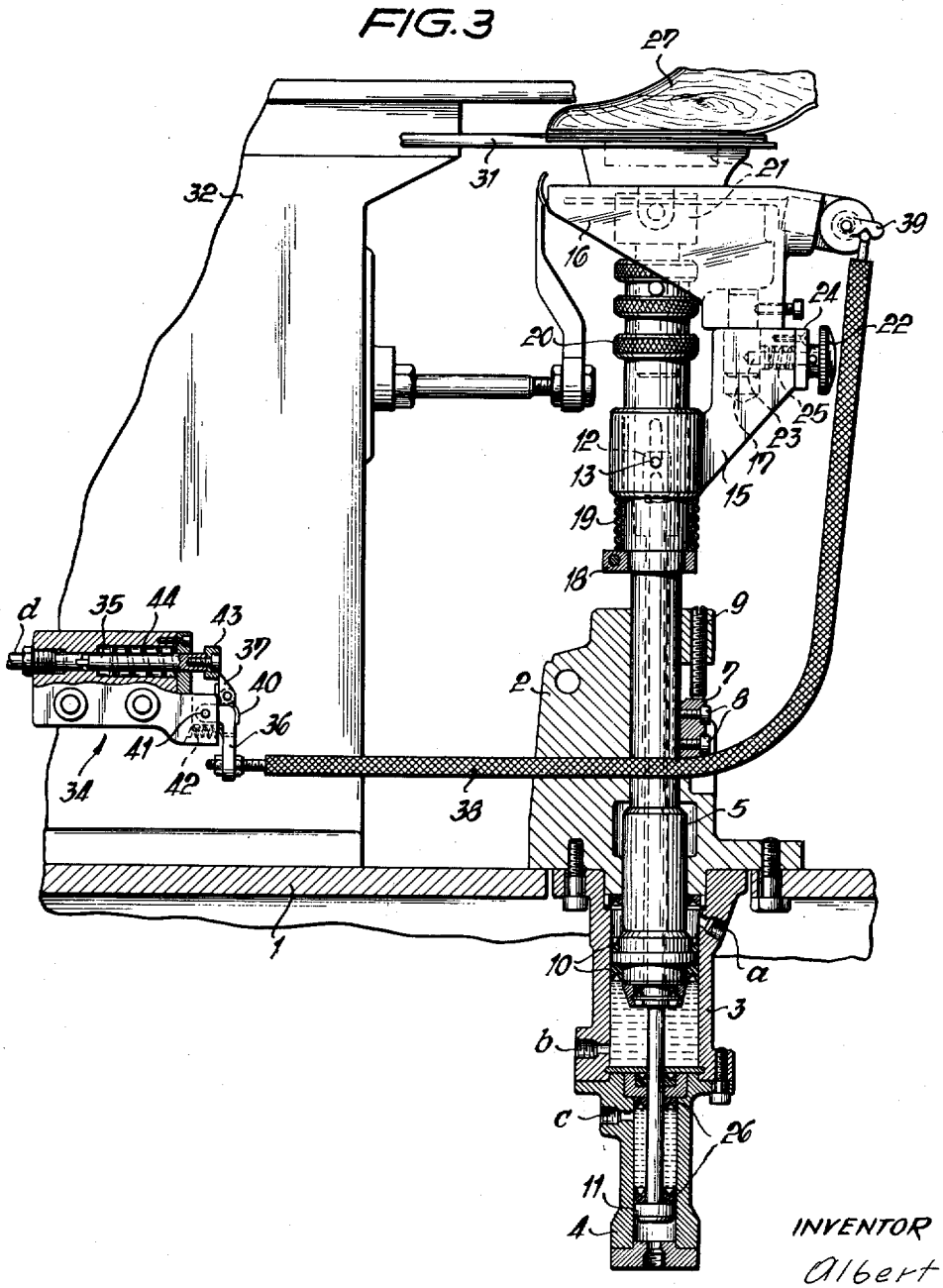
FIG. 3 is a view similar to that of FIG. 1, but showing the condition of the arrangement just prior to the wiping-in phase of the operation.
Figure 7:
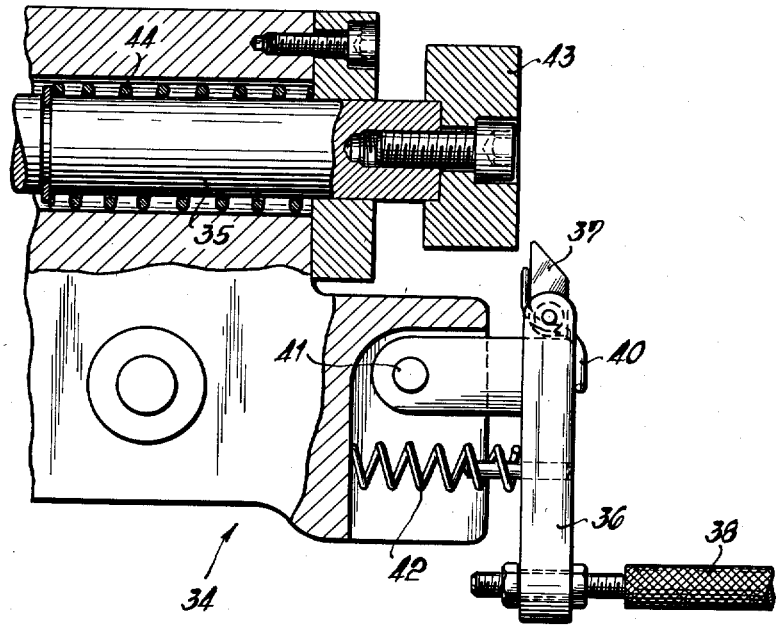
FIG. 7 shows a detail of the views of FIGS. 1 and 3, drawn to enlarged scale.

In addition to the usual wipers 31 which have been previously mentioned, a machine embodying the present invention is provided with the usual pincers 30 (FIG. 2) which are adapted to grip the lasting margin of upper 28 and to exert a downward pull thereon for stretching the upper over the last 27 while last rest 21 is urged upwardly by fluid under pressure admitted to cylinder 3 through the lower inlet b, and while spring 19 is effective to urge bed member 16 upwardly for pressing the entire extent of the innersole 29 against the bottom of last 27, as shown in FIG. 2.

Figure 5:
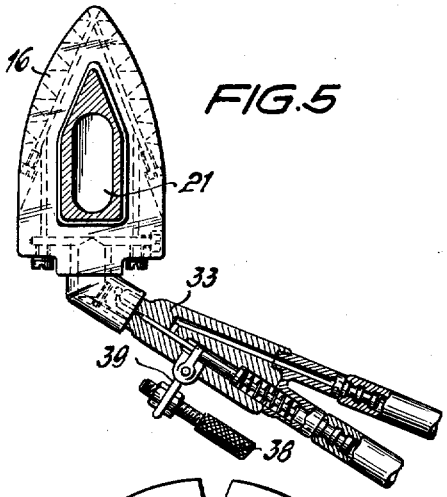
FIG. 5 is a top plan view of the arrangement embodying the invention.
Figure 6:
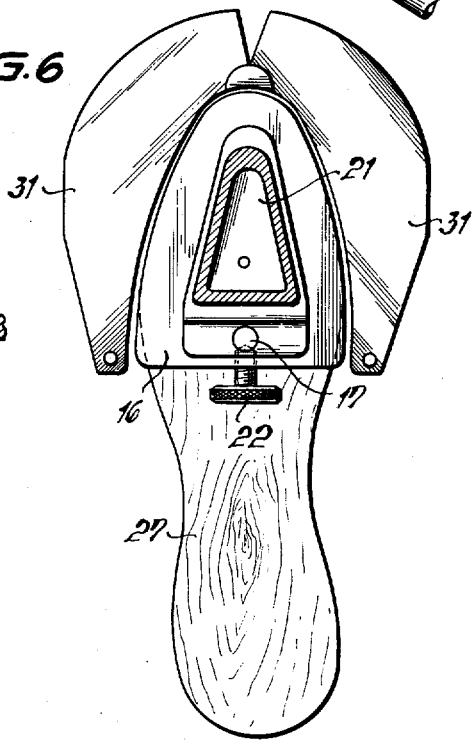
FIG. 6 is a plan view showing the relationship of the usual wipers to the last rest and the surrounding bed member in the arrangement embodying the invention.
Figure 4:
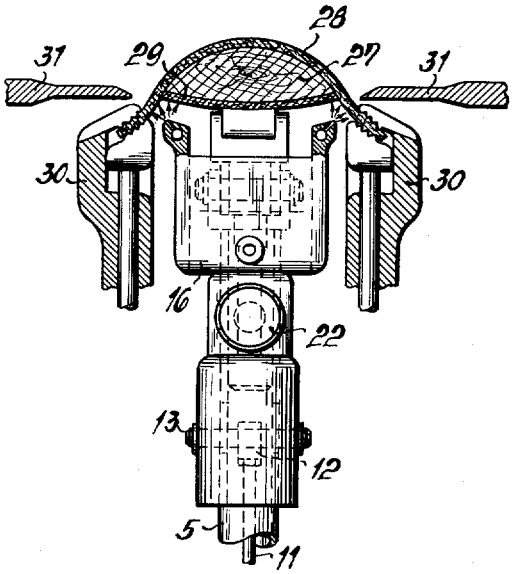
FIG. 4 is a view similar to that of FIG. 2, but showing the relation of the parts during the adhesive spraying operation.

As shown in FIGS. 4 and 5, the shaped bed member is formed with a number of nozzles or orifices opening at the periphery thereof and communicating with passages formed within the bed member to receive a suitable cement or adhesive from a spray gun 33 (FIG. 5) which is attached to the bed member 16. The spray gun 33 has a needle valve which is normally spring urged to its closed position in order to interrupt the supplying of adhesive or cement to the passages of bed member 16, and a lever 39 is pivoted on the housing of spray gun 33 and engages the needle valve of the latter in order to move the needle valve to its open position in response to the actuation of a Bowden cable 38 which extends from lever 39 to a lever 36 which is pivoted, as at 41, on the housing of an hydraulic actuator 34 (FIG. 1). A spring 42 acts on lever 36 to urge the latter in the counterclockwise direction, as viewed in FIG. 1, that is, tending to displace the Bowden cable 38 in the direction for closing the needle valve of spray gun 33. A plunger 35 is axially reciprocable within a bore formed in the housing of actuator 34 and adapted to receive fluid under pressure through an inlet d so that such fluid under pressure can act on plunger 35 to displace the latter toward the right, as viewed in FIG. 1. A helical spring acts on plunger 35 to return the latter towards the left, as viewed in FIG. 1, and a head 43 is secured on the projecting end of plunger 35 and is engageable with a pawl 37 which is pivoted on lever 36 and acted upon by a torsion spring 40 tending to maintain pawl 37 in an extended position projecting into the path of movement of head 43 on plunger 35.

When plunger 35 is displaced toward the right or extended from the housing by the admission of fluid under pressure through inlet d, head 43 acts on pawl 37 to rock lever 36 in the clockwise direction, as viewed in FIG. 1, and thereby open the needle valve of spray gun 33 until head 43 moves past pawl 37 and thereby frees lever 36 for return by spring 42 in the direction for again closing the valve of spray gun 33. During the return stroke of plunger 35, head 43 deflects pawl 37 out of its path of movement in opposition to the action of torsion spring 40, whereby lever 36 is not again displaced during the return movement of plunger 35. Thus, it will be apparent that, when fluid under pressure is supplied through inlet d to the bore containing plunger 35, the valve of spray gun 33 is momentarily opened to permit adhesive or cement to be supplied from the spray gun to the nozzles of bed member 16 for application to the peripheral portion of the innersole and also to the lasting margin of the shoe upper, as indicated in FIG. 4.

The above described pulling-over and cement spraying lasting machine operates in the following manner:

After the upper 28 has been slipped over the last 27 carrying the innersole 29 and the lasting margin of the upper 28 is introduced into the pincers 30, a suitable control, for example, a pedal (not shown), is actuated to cause the lasting margin of the upper to be gripped by the pincers while oil under pressure, for example, hydraulic fluid, is supplied to the inlet b of cylinder 3 for moving the hollow piston rod 5 upwardly, thereby to press the three-point rest 21 against the innersole 29 underlying the last 27. Such upward movement of the last rest 21 is limited by the adjustable stop or abutment 9 engageable with the block 8 carried by the hollow piston rod 5. Since hydraulic fluid under pressure is not then supplied to the inlet c of auxiliary cylinder 4, the spring 19 is effective to move the bracket 15 and the bed member 16 upwardly with the last rest 21, and the vertical positioning of the bed member 16 relative to the last rest 21 is determined, in this position, by a ring 20 which is screwed onto a threaded portion of the hollow piston rod 5 above the sleeve of bracket 15 and which is engageable by such sleeve. Thus, the bed member 16 is resiliently held against the underside of innersole 29 and maintains a uniform pressure for holding the latter smoothly against the bottom of the last.

It will be apparent that the upward movement of the last rest 21 carrying the last 27 causes the upper 28 to be drawn or pulled tightly over the last, while the uniformly applied pressure of bed member 16 against the innersole 29 ensures that the latter will be smoothly shaped to the bottom of the last.

After the upper 28 has been pulled over last 27 and the innersole 29 has been smoothly applied to the bottom of the last, fluid under pressure is admitted through the inlet c of auxiliary cylinder 4 to displace piston 11 downwardly, whereby bed member 16 is moved downwardly away from the innersole. At the same time, fluid under pressure is admitted through the inlet d of hydraulic actuator 34 and acts upon plunger 35 in order to momentarily open the needle valve of spray gun 33, in the manner previously described, whereby cement or adhesive is sprayed from the nozzles of bed member 16 and applied to the peripheral portion of innersole 29 and to the last margin of upper 28. The further introduction of fluid under pressure through inlet c into auxiliary cylinder 4 causes the further downward movement of bed member 16 relative to last rest 21, and the wipers 31 are then immediately operated to wipe in the lasting margin of upper 28 under the peripheral portions of innersole 29. Due to the previous smooth application of the innersole to the bottom of last 27 by the action of bed member 16, the danger that the lasting margin of the upper may be wiped in between the innersole and the bottom of the last is positively avoided.

Although a particular embodiment of the invention has been described in detail herein with reference to the accompanying drawings, it is to be understood that the invention is not limited to that precise embodiment, and that various changes and modifications may be effected therein without departing from the scope or spirit of the invention, except as defined in the appended claims.

I claim:

1. In a lasting machine for pulling a shoe upper over a last and cementing the lasting margin of the upper to an innersole disposed against the bottom of the last; the combination of a last carrying arrangement including an inner three-point support and an outer member surrounding said inner support with a small clearance therebetween, means urging said outer member upwardly relative to said inner support in order to press the innersole against the bottom of the last, said outer member being shaped to accurately conform to the contour of the last and being substantially coextensive with the innesole so that the latter is uniformly held against the bottom of the last, fluid pressure operated means for lowering said outer member relative to said inner support in order to permit wiping-in of the lasting margin of the upper, said outer member having passages therein and orifices extending from said passages and opening *in the surface* [at the periphery] of the outer member, and means for supplying adhesive to said passages [during initial lowering of said outer member relative to said inner support] so that the adhesive issues from said orifices *prior to wiping in of the last margin* and is applied *so that* [to] the bottom of the innersole and [to] the last margin of the upper *adhere to each other after* [prior to] wiping in of the latter.

2. In a lasting machine, the combination as in claim 1; further comprising a main cylinder with a piston reciprocable therein and a hollow piston rod extending upwardly from the latter and carrying said inner support at its upper end, means for admitting fluid under pressure to said main cylinder adjacent the lower and upper ends of the latter for raising and lowering, respectively, said inner support, a bracket slidable on said hollow piston rod and means releasably securing said outer member on said bracket.

3. In a lasting machine, the combination as in claim 2; wherein said means releasably securing the outer member on the bracket includes a pin extending from said outer member and received in a bore of said bracket, a locking bolt slidably carried by said bracket and spring urged to project into said bore, said pin having a recess normally receiving said locking bolt to prevent removal of said pin from said bore, and a knob on said locking bolt to permit manual withdrawal of said locking bolt from said recess and thereby free said pin of the outer member for removal from said bore of said bracket.

4. In a lasting machine, the combination as in claim 2; wherein said means urging the outer member upwardly relative to said inner support includes an abutment fixed on said hollow piston rod below said bracket and a helical compression spring on said hollow piston rod between said abutment and said bracket to urge the latter upwardly relative to the hollow piston rod.

5. In a lasting machine, the combination as in claim 4; wherein said hollow piston rod has an externally threaded portion above said bracket, and further comprising an internally threaded ring on said threaded portion of the hollow piston rod acting as an adjustable stop engageable by said bracket to limit the upward movement of said outer member relative to said inner support.

6. In a lasting machine, the combination as in claim 2; wherein said fluid pressure operated means for lowering said outer member includes an auxiliary cylinder disposed below said main cylinder, a piston reciprocable in said auxiliary cylinder and having an inner piston rod extending therefrom axially through said hollow piston rod, means coupling said bracket to said inner piston rod, and means for admitting fluid under pressure to said auxiliary cylinder above said piston in the latter.

7. In a lasting machine, the combination as in claim 1; wherein said means for supplying adhesive to said passages of the outer member includes a spray gun having a normally closed shut-off valve and an operating lever for the latter, a Bowden cable connected to said operating lever for actuating the latter so as to open said shut-off valve, a fluid pressure operated actuator having a housing with a bore therein receiving a plunger and means for admitting fluid under pressure to said bore for displacing said plunger, a control lever pivoted on said housing and connected to said Bowden cable, and cooperating means on said plunger and control lever, respectively, engageable upon displacement of said plunger to momentarily rock said control lever in the direction for causing said shut-off valve to open.

8. In a lasting machine, the combination as in claim 7; wherein said cooperating means on said plunger and control lever includes an enlarged head on said plunger and a pawl pivoted on said control lever and spring urged in one direction to a position relative to the control lever where said pawl projects into the path of movement of said head, so that, during displacement of said plunger, said head moves past said pawl and momentarily displaces the latter out of said path of movement to correspondingly rock said control lever and, during the return of said plunger, said head pivots said pawl away from said position relative to the control lever and permits the latter to remain stationary.

References Cited in the file of this patent or the original patent

UNITED STATES PATENTS 2,024,175 Le Retto ---------- Dec. 17, 1935